UNITED STATES PATENT OFFICE.

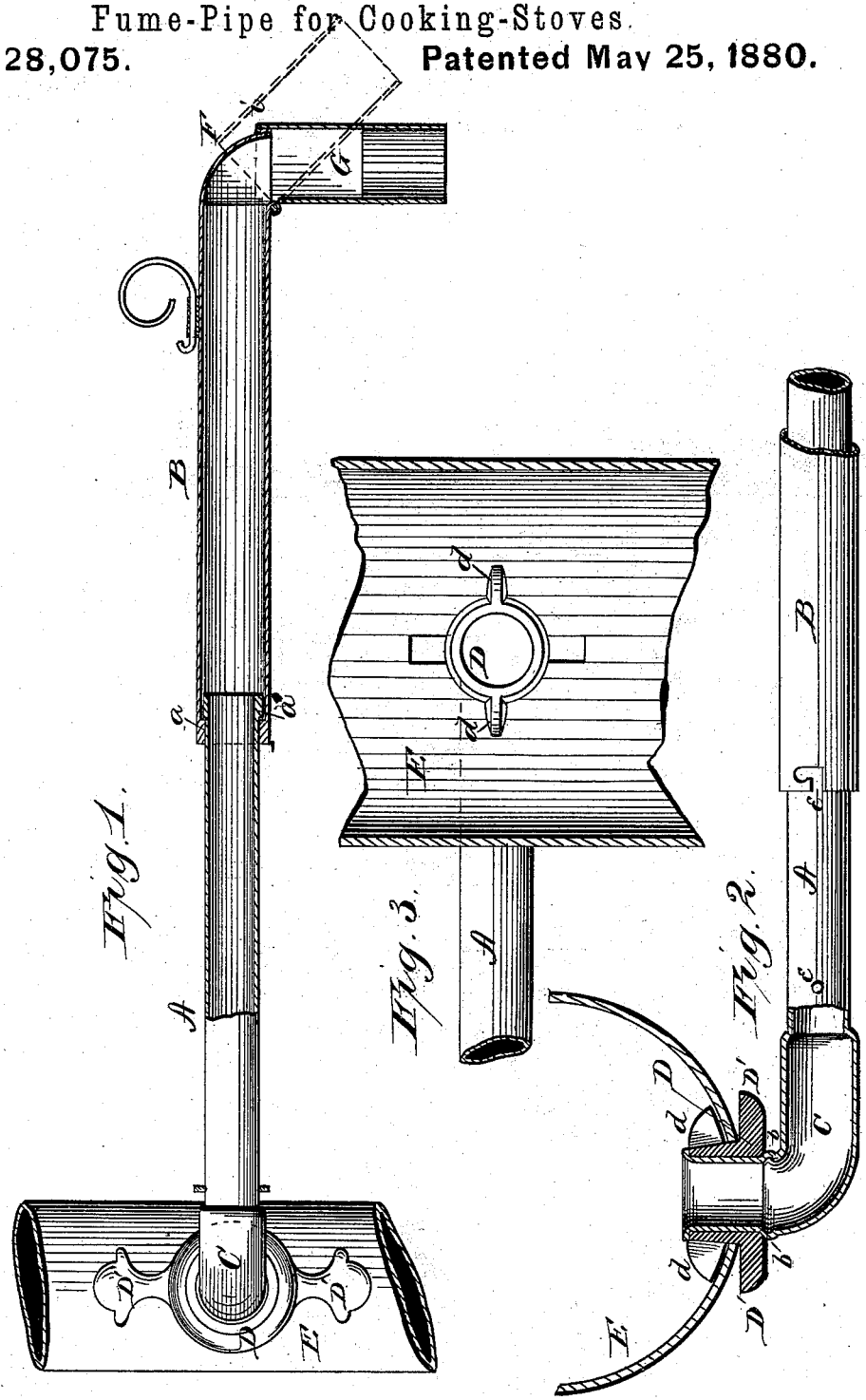

CHARLES ILLING, OF JEFFERSON, WISCONSIN.

FUME-PIPE FOR COOKING-STOVES.

SPECIFICATION forming part of Letters Patent No. 228,075, dated May 25, 1880.

Application filed April 5, 1880. (No model.)

*To all whom it may concern:*

Be it known that I, CHARLES ILLING, of Jefferson, in the county of Jefferson, and in the State of Wisconsin, have invented certain new and useful Improvements in Pipes for Carrying Off Fumes from Cooking-Stoves; and I do hereby declare that the following is a full, clear, and exact description thereof, reference being had to the accompanying drawings, and to the letters of reference marked thereon, making a part of this specification.

The nature of my invention consists in the construction and arrangement of a device for carrying off the steam and odors from food while being cooked, &c., as will be hereinafter more fully set forth.

In order to enable others skilled in the art to which my invention appertains to make and use the same, I will now proceed to describe its construction and operation, referring to the annexed drawings, in which—

Figure 1 is a side view, partly in section, of my device. Figs. 2 and 3 are detailed views of the same.

A and B represent two tubes or pipes of any suitable dimensions, working one within the other, so as to be extended or contracted, according to the distance the pot or vessel is from the stove-pipe. The two tubes or pipes have their inner ends formed with enlargements *a a*, as shown in Fig. 1, on the inner and outer sides, respectively, to form stops for preventing the pipes from coming apart.

On the outer end of the tube A is attached an elbow, C, on which is formed a collar, *b*, and against this collar, on the elbow, is placed a cast-metal ring, D, having suitable projections D', for convenience in turning the same. The ring D is formed with a hub, on which are two hooks, *d d*.

E represents the stove-pipe, at a suitable point in which is made a round hole with two slots opposite each other.

The cast-metal ring D is held on the elbow by upsetting the edge of the elbow, as shown in Fig. 2.

The hub of the ring is passed through the hole in the stove-pipe, and the hooks *d* enter the slots, after which the ring is turned about one-quarter around to either side, which causes the hooks to bind on the inside of the stove-pipe and hold the device secure thereto, while at the same time the tubes A B are swiveled, so that they can be raised or lowered, or, in other words, set at different angles, to accommodate the height of the pot or other vessel to which the device is to be applied.

The two tubes are also formed with an ordinary bayonet-lock, as shown at *e*, so as to be held together when contracted to the shortest limit.

On the outer end of the tube B is formed a half-elbow, F, with a short pipe, G, hinged to its under side, the hinge being formed of the same metal of which the parts are made.

The parts F and G are formed with stops at *i i*, to prevent them from coming apart, while the part G may be turned more or less over the part F, so as to adjust the tube G according to the inclination of the pipes A B.

The tube G is to be inserted in a hole in the cover of the pot, and all steam and fumes will therefore pass up into the chimney, and not escape into the room.

I am aware that adjustable and extensible fume-pipes have been used; and I do not claim such, broadly, as my invention.

Having thus fully described my invention, what I claim as new, and desire to secure by Letters Patent, is—

1. The combination of a telescopic tube, A B, having stops *a a*, elbow C, with shoulder *b*, and the ring D, having projections D' and hooks *d*, substantially as and for the purposes herein set forth.

2. The combination of the tube A, provided with the elbow C and ring D, having projections D' and hooks *d*, with the tube B, provided with the half-elbow F and hinged tube G, all constructed substantially as and for the purposes herein set forth.

In testimony that I claim the foregoing I have hereunto set my hand this 20th day of March, 1880.

CHARLES ILLING.

Witnesses:
NELSON BRUETT,
WM. VERHALEN.